United States Patent
Lynch et al.

(10) Patent No.: US 10,284,607 B2
(45) Date of Patent: May 7, 2019

(54) SELECTIVE BYPASSING OF DAISY-CHAINED NETWORK DEVICES

(71) Applicant: Simmonds Precision Products, Inc., Vergennes, VT (US)

(72) Inventors: Michael A. Lynch, Shelburne, VT (US); Lei Liu, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 216 days.

(21) Appl. No.: 15/195,448

(22) Filed: Jun. 28, 2016

(65) Prior Publication Data

US 2017/0374108 A1    Dec. 28, 2017

(51) Int. Cl.
  *G06F 15/16*    (2006.01)
  *H04L 29/06*    (2006.01)
  *G06F 13/40*    (2006.01)
  *H04L 12/24*    (2006.01)

(52) U.S. Cl.
  CPC ...... *H04L 65/1069* (2013.01); *G06F 13/4063* (2013.01); *H04L 41/0654* (2013.01)

(58) Field of Classification Search
  CPC ............. H04L 65/1069; H04L 41/0654; G06F 13/4063
  USPC ........................................................ 709/227
  See application file for complete search history.

(56) References Cited

U.S. PATENT DOCUMENTS

| | | | |
|---|---|---|---|
| 6,775,726 B2 | 8/2004 | Chong | |
| 6,785,725 B1 * | 8/2004 | Ramanan | H04L 12/427 709/227 |
| 7,664,012 B2 | 2/2010 | Cohn | |
| 8,484,686 B2 | 7/2013 | Bird et al. | |
| 8,842,519 B2 | 9/2014 | Johnson et al. | |
| 8,873,370 B2 * | 10/2014 | Robitaille | G06F 1/266 370/216 |
| 10,158,213 B2 * | 12/2018 | Burch | H02B 7/06 |
| 2003/0219025 A1 | 11/2003 | Choi et al. | |

(Continued)

FOREIGN PATENT DOCUMENTS

| | | |
|---|---|---|
| EP | 1638260 A1 | 3/2006 |
| WO | 9316540 A2 | 8/1993 |

OTHER PUBLICATIONS

Extended European Search Report, for European Patent Application No. 17174630.8, dated Nov. 2, 2017, 8 pages.

*Primary Examiner* — Anthony Mejia
(74) *Attorney, Agent, or Firm* — Kinney & Lange, P.A.

(57) ABSTRACT

Apparatus and associated methods relate to selectively bypassing a daisy-chained network device based on a timing of a series of reset signals. The daisy-chained network device is bypassed if an elapsed time from a last of the reset signals of the series is longer than a predetermined time period. While no interval between adjacent reset signals of the series exceeds the predetermined time period, the daisy-chained network device is not bypassed. In some embodiments, the daisy-chained network device generates the series of reset signals. If the daisy-chained network device fails to generate a next reset signal within the predetermined time period as measured from a previous reset signal, the daisy-chained network device is bypassed. If the daisy-chained network device loses power, it will be bypassed as the reset signals will not be generated, but if the daisy-chained network device regains power, it can be reinserted into the network daisy-chain.

20 Claims, 5 Drawing Sheets

(56) References Cited

U.S. PATENT DOCUMENTS

| | | | |
|---|---|---|---|
| 2004/0153914 A1* | 8/2004 | El-Batal | G11C 29/02 714/724 |
| 2007/0025240 A1* | 2/2007 | Snide | H04L 12/40169 370/217 |
| 2007/0061056 A1* | 3/2007 | Valsorda | B61L 15/0036 701/20 |
| 2007/0081557 A1* | 4/2007 | Binetti | H04L 69/14 370/469 |
| 2013/0278082 A1 | 10/2013 | Barstz et al. | |
| 2015/0222541 A1* | 8/2015 | West | H04L 41/0806 370/216 |
| 2015/0295756 A1 | 10/2015 | Yin et al. | |

\* cited by examiner

SELECTIVE BYPASSING OF DAISY-CHAINED NETWORK DEVICES

BACKGROUND

Daisy-chained network configurations can reduce cost and weight associated to wirings. This can be especially important in aerospace applications, where reducing aircraft weight can be a design goal. Each device that is daisy-chain connected to a network has at least two network connecting ports, one for communicating with upstream daisy-chain connected devices, and one for communicating with downstream daisy-chain connected devices.

If one daisy-chain connected device sends a communication to another daisy-chain connected device, any devices connected between receive the communication on one of its network connecting ports and then retransmit the communication on the other of its network connecting ports. Should such an intervening device lose its ability to relay such a communication, the communication would fail.

Some aircraft use daisy-chain networks to connect Wireless Remote Data Concentrators (WRDCs). WRDCs are wireless communications nodes that can be daisy-chained to a wired network, such as an Ethernet network. Loss of function of one WRDC could render the remaining WRDCs along the daisy-chain incapable of communicating. For example, failures of WRDCs positioned upstream in the daisy-chain could render all downstream devices unable to communicate with upstream devices or systems. A method is needed to selectively bypass a WRDC on a daisy-chain configured network to permit the remainder of WRDCs to continue to be able to communicate.

SUMMARY

Apparatus and associated devices relate to a switching device for bypassing a daisy-chained network device from a wired network. The switching device includes a first network connector configured to connect to a first wired network port of the daisy-chained network device. The switching device includes a second network connector configured to connect to a second wired network port of the daisy-chained network device. The switching device includes a normally-closed switch having a first terminal, a second terminal and a pole. The first terminal is electrically connected to the first network connector. The second terminal electrically is connected to the second network connector. The pole, when energized, opens the normally-closed switch such that the first and second terminals are electrically isolated from one another. The switching device includes a resettable timer having an input port and an output port. The input port is configured to receive reset signals. The output port is electrically coupled to the pole of the normally-closed switch. The resettable timer is configured to generate an output signal on the output port that energizes the pole during a predetermined time period following every reset signal received and de-energizes the pole after the predetermined time period following a last of the received reset signals.

Some embodiments relate to a method for selectively bypassing a daisy-chained device from a wired network. The method includes providing a first network connector configured to electrically connect to a first wired network port. The method includes providing a second network connector configured to electrically connect to a second wired network port. The method includes receiving a series of reset signals. The method includes electrically disconnecting the first network connector from the second network connector during a predetermined time period following a last of the received reset signals of the series. The method also includes electrically connecting the first network connector to the second network connector after the predetermined time period following the last of the received reset signals of the series.

Some embodiments relate to a switching device for bypassing a daisy-chained network device from a wired network. The switching device includes a first network connector configured to connect to a first network port of the daisy-chained network device. The switching device includes a second network connector configured to connect to a second network port of the daisy-chained network device. The switching device includes a normally-closed switch having a first terminal, a second terminal and a pole. The first terminal is electrically connected to the first network connector. The second terminal is electrically connected to the second network connector. The pole, when energized, opens the normally-closed switch such that the first and second terminals are electrically isolated from one another. The switching device includes a resettable counter configured to generate a count value from an initial count value to a final count value at a predetermined rate when the count value is not equal to the final count value. The count value is set to the initial count value upon receiving a reset signal. The resettable counter is configured to energize the pole of the normally-closed switch in response to the count value being not equal to the final count value and to de-energize the pole in response to the count value being equal to the final count.

DETAILED DESCRIPTION

Apparatus and associated methods relate to selectively bypassing a daisy-chained network device based on a timing of a series of reset signals. The daisy-chained network device is bypassed if an elapsed time from a last of the reset signals of the series is longer than a predetermined time period. While no interval between adjacent reset signals of the series exceeds the predetermined time period, the daisy-chained network device is not bypassed. In some embodiments, the daisy-chained network device generates the series of reset signals. If the daisy-chained network device fails to generate a next reset signal within the predetermined time period as measured from a previous reset signal, the daisy-chained network device is bypassed. If the daisy-chained network device loses power, it will be bypassed as the reset signals will not be generated, but if the daisy-chained network device regains power, it can be reinserted into the network daisy-chain.

Figure 1:
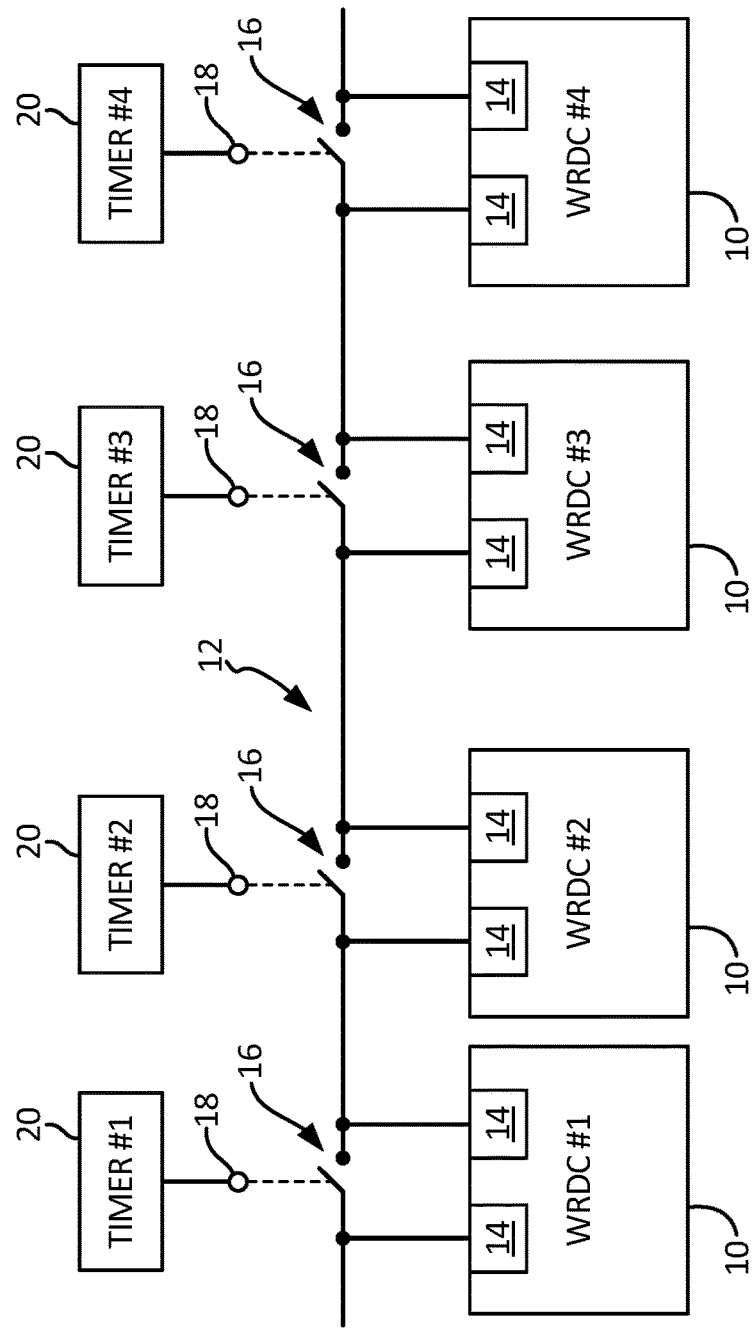
FIG. 1 is a schematic view of a daisy-chained network of devices each having a bypass switch.

FIG. 1 is a schematic view of a daisy-chained network of devices each having a bypass switch. In FIG. 1, four WRDCs 10 are daisy-chain connected to a communications bus 12. Each WRDC 10 is connected to communications bus 12 via two device network ports 14. Bypass switches 16 provide a switchable conduction path between pairs of device network ports 14 that connect to each WRDC 10 to communications bus 12. When bypass switches 16 are open, each WRDC 10 is connected to communications bus 12 in daisy chain fashion. When bypass switches 16 are closed, however, each WRDC 10 is effectively bypassed from communications bus 12. In some embodiments, connection switches can be used to disconnect each device network port 14 from communications bus 12.

In an exemplary embodiment, bypass switches 16 are normally-closed switches so that if a local power source fails, the WRDC 10 associated with the local power source can be bypassed. Each bypass switch 16 is controlled by pole 18. Each pole 18 is electrically energized or de-energized by a timer 20. In an exemplary embodiment, timer 20 is a resettable timer that provides a pole energizing signal to pole 18 when timer 20 has not expired, and then de-energizes pole 18 when timer 20 expires. When pole 18 is energized, normally-closed bypass switch 16 is open, enabling WRDC 10 to be daisy-chain connected to communications bus 12. When pole 18 is de-energized, normally-closed bypass switch 16 is closed, effectively bypassing WRDC 10 from communications bus 12. In some embodiments, normally-opened connection switches can be used to provide switchable connection between device network ports 14 and communications bus 12. Such normally-opened connection switches can be controlled by pole 18 simultaneously with normally-closed bypass switches 16.

In various embodiments, timer 20 is controlled in various ways. For example, in some embodiments, timer 20 is controlled by corresponding WRDC 10. In some embodiments, timer 20 is a part of WRDC 10. In some embodiments, timer 20 has its own controller. In various embodiments, timer 20 receives control commands from various sources. For example, in some embodiments, timer 20 receives control commands over communications bus 12. In some embodiments, timer 20 receives control commands via a command port. Timer 20, for example, may receive control commands from corresponding WRDC 10, via such a command port electrically coupled to a corresponding WRDC 10. In an exemplary embodiment a network controller and/or master device can send command signals to timer 20.

Figure 2:
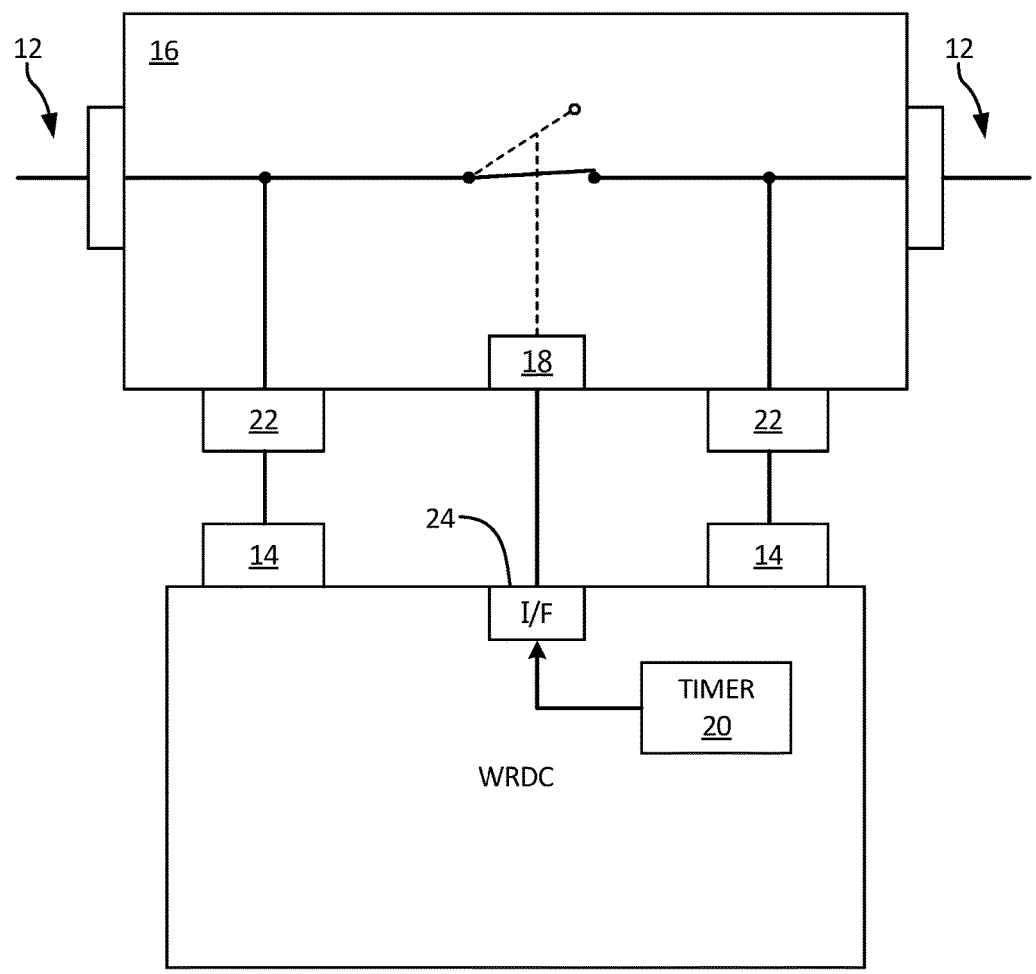
FIG. 2 is a schematic diagram of a switching device for bypassing a daisy-chained network device from a network.

FIG. 2 is a schematic diagram of a switching device for bypassing a daisy-chained network device from a network. FIG. 2 depicts a single WRDC 10 and a single bypass switch 16 shown in FIG. 1. WRDC 10 is connected to communications bus 12, via bypass switch 16. Device network ports 14 couple to corresponding switch network ports 22 of bypass switch 16. Bypass switch 16 is normally-closed, and is opened if pole 18 is energized. Pole 18 is electrically connected to WRDC 10 via interface 24. WRDC 10 provides timer 20, which provides signals to energize and/or de-energize pole 18. In the depicted embodiment, WRDC 10 provides a series of reset signals to timer 20. In some embodiments, timer 20 is a resettable timer. In such an embodiment, if a series of reset signals is provided at a sufficiently high rate so that resettable timer 20 doesn't expire, but instead is regularly reset, then pole 18 will be continuously energized. While pole 18 is energized, WRDC 10 is electrically connected to communications bus 12 in daisy-chain fashion. If, however, pole 18 becomes de-energized, then WRDC 10 will be effectively bypassed by normally-closed bypass switch 16.

Figure 3:
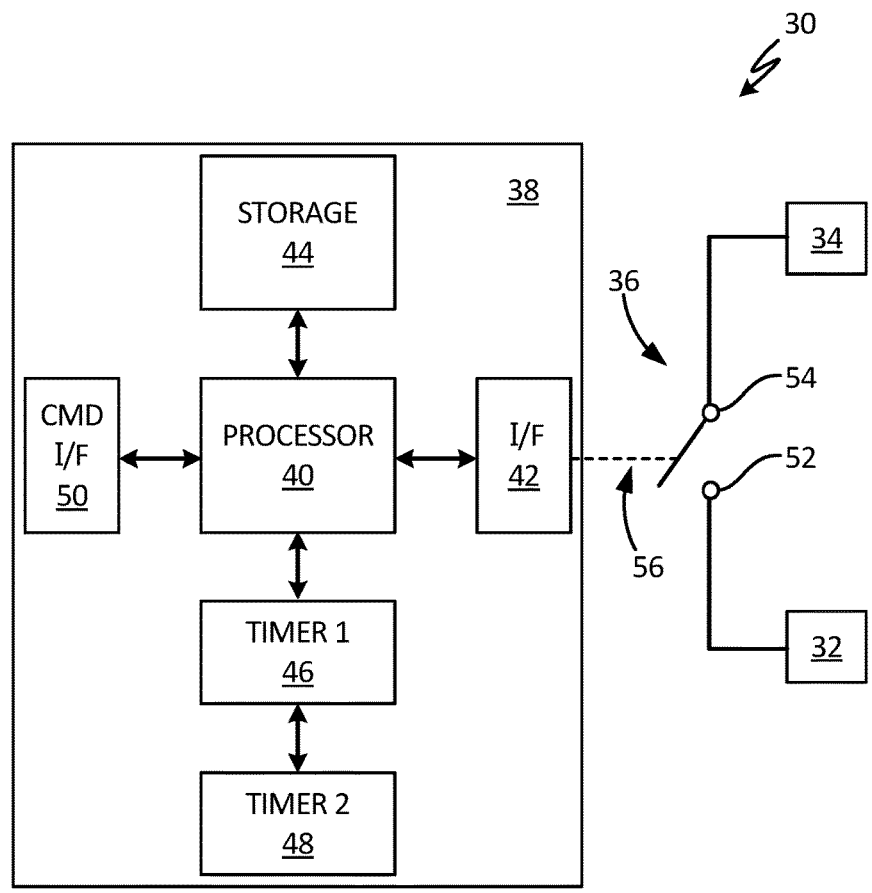
FIG. 3 is a block diagram of an exemplary switching device for bypassing a daisy-chained network device from a network.

FIG. 3 is a block diagram of an exemplary switching device for bypassing a daisy-chained network device from a network. In FIG. 3, switching device 30 includes first network connector 32, second network connector 34, normally-closed switch 36 and resettable timer 38. Normally-closed switch 36 has first terminal 52, second terminal 54 and a pole 56. First terminal 52 is electrically connected to first network connector 32. Second terminal 54 is electrically connected to second network connector 34. Pole 56, when energized, opens normally-closed switch 36 such that first and second terminals 52, 54 are electrically isolated from one another. Resettable timer 38 includes processor(s) 40, switch interface 42, storage device(s) 44, first timer 46, second timer 48, and command interface 50. However, in certain examples, resettable timer 38 can include more or fewer components.

Processor(s) 40, in one example, is configured to implement functionality and/or process instructions for execution within resettable timer 38. For instance, processor(s) 40 can be capable of processing instructions stored in storage device(s) 44. Examples of processor(s) 40 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 44 can be configured to store information within controller 42 during operation. Storage device(s) 44, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 44 are a temporary memory, meaning that a primary purpose of storage device(s) 44 is not long-term storage. Storage device(s) 44, in some examples, are described as volatile memory, meaning that storage device(s) 44 do not maintain stored contents when power to controller 42 is turned off. Examples of volatile memories can include random access memories (RAM), dynamic random access memories (DRAM), static random access memories (SRAM), and other forms of volatile memories. In some examples, storage device(s) 44 are used to store program instructions for execution by processor(s) 40. Storage device(s) 44, in one example, are used by software or applications running on resettable timer 38 (e.g., a software program implementing resettable timing functions) to temporarily store information during program execution.

Storage device(s) 44, in some examples, also include one or more computer-readable storage media. Storage device(s) 44 can be configured to store larger amounts of information than volatile memory. Storage device(s) 44 can further be configured for long-term storage of information. In some examples, storage device(s) 44 include non-volatile storage elements. Examples of such non-volatile storage elements can include magnetic hard discs, optical discs, flash memories, or forms of electrically programmable memories (EPROM) or electrically erasable and programmable (EEPROM) memories.

Command interface 50, in some examples, includes a communications module. Command interface 50, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB). In some embodiments, command interface 50 is configured to communicate via the communications bus connected to first network connector 32 or second network connector 34.

First timer 46 can be implemented in various ways. For example, in one embodiment, first timer 46 can be a resettable counter configured to generate a first count value from a first initial count value to a first final count value at a predetermined rate when the first count value is not equal to the first final count value. The first count value can be set to the first initial count value upon receiving a reset signal via command interface 50. Processor(s) 40 may generate a signal to energize pole 56 of normally-closed switch 36 in response to the first count value being not equal to the first final count value. Processor(s) 40 may then de-energize pole 56 of normally-closed switch 36 in response to the first count value being equal to the first final count value.

Second timer 48 can be implemented in various ways. In an exemplary embodiment, second timer 48 can be a counter configured generate a second count value from a second initial count value to a second final count value at a predetermined rate when the second count value is not equal to the second final count value. The second count value can be set to the second initial count value upon receiving a remove command signal via command interface 50. Processor(s) 40 may generate a signal to de-energize pole 56 of normally-closed switch 36 in response to the second count value being not equal to the second final count value. Processor(s) 40 may then energize pole 56 of normally-closed switch 36 in response to the second count value being equal to the second final count value. In this way, second timer 48 may be used to bypass whatever device is connected to first and second network connectors 32, 34 from a daisy-chained communications network also connected thereto. In some embodiments, processor(s) 40 may bypass whatever device is connected to network connectors 32, 34 if second count value is not equal to second final count value, regardless of a state of the first count value. In this way, a remove command can be given priority over a reset signal.

Figure 4:
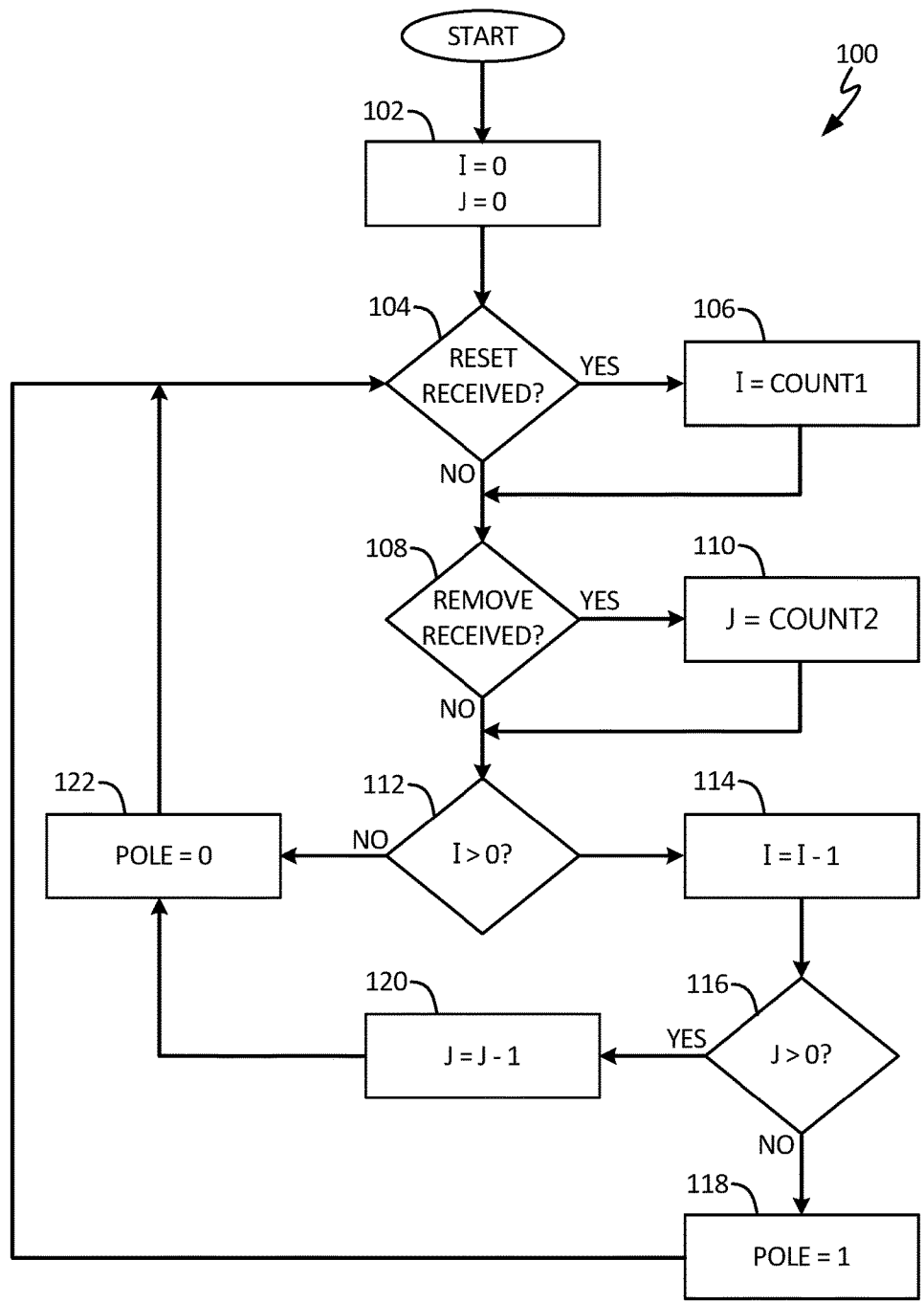
FIG. 4 is a flow chart of an exemplary method for selectively bypassing a daisy-chained device from a network.

FIG. 4 is a flow chart of an exemplary method for selectively bypassing a daisy-chained device from a network. In FIG. 4, method 100 is depicted from the vantage point of processor(s) 40 of FIG. 3. Method 100 begins at step 102 where processor(s) 40 initializes counter indices I and J. Then, at step 104, processor(s) 40 determines whether a RESET signal has been received. If, at step 104, a RESET signal has been received, then the method proceeds to step 106, where processor(s) 40 sets counter index I to initial count value COUNT1. Method 100 proceeds from step 106 to step 108. If at step 104, however, a RESET signal has not been received, then method 100 proceeds to step 108. At step 108, processor(s) 40 determines if a REMOVE command has been received. If, at step 108, a REMOVE command has been received, then method 100 proceeds to step 110, where processor(s) 40 sets counter index J to initial count value COUNT2. Method 100 continues from step 110 to step 112. If at step 108, however, a REMOVE command has not been received, then method 100 proceeds to step 112.

At step 112, processor(s) 40 determines if counter index I is greater than zero. If, at step 112, counter index I is greater than zero, then method 100 proceeds to step 114, where processor(s) 40 decrements counter index I. Method 100 proceeds from step 114 to step 116, where processor(s) 40 determines if counter index J is greater than zero. If, at step 116, counter index J is greater than zero, then method 100 proceeds to step 120, where processor(s) 40 decrements counter index J. Method 100 continues from step 120 to step 122, where processor(s) 40 generates a signal for de-energizing pole 56 (shown in FIG. 3). If, at step 112, counter index I was not greater than zero, method 100 also proceeds to step 122, where processor(s) 40 generates a signal for de-energizing pole 56. If, at step 116, counter index J was not greater than zero, then method 100 proceeds to step 118, where processor(s) 40 generates a signal to energize pole 56. Note that pole 56 is energized if both counter index I (RESET signal counter value) is greater than zero and counter index J (REMOVE command counter value) is not greater than zero.

Figure 5:
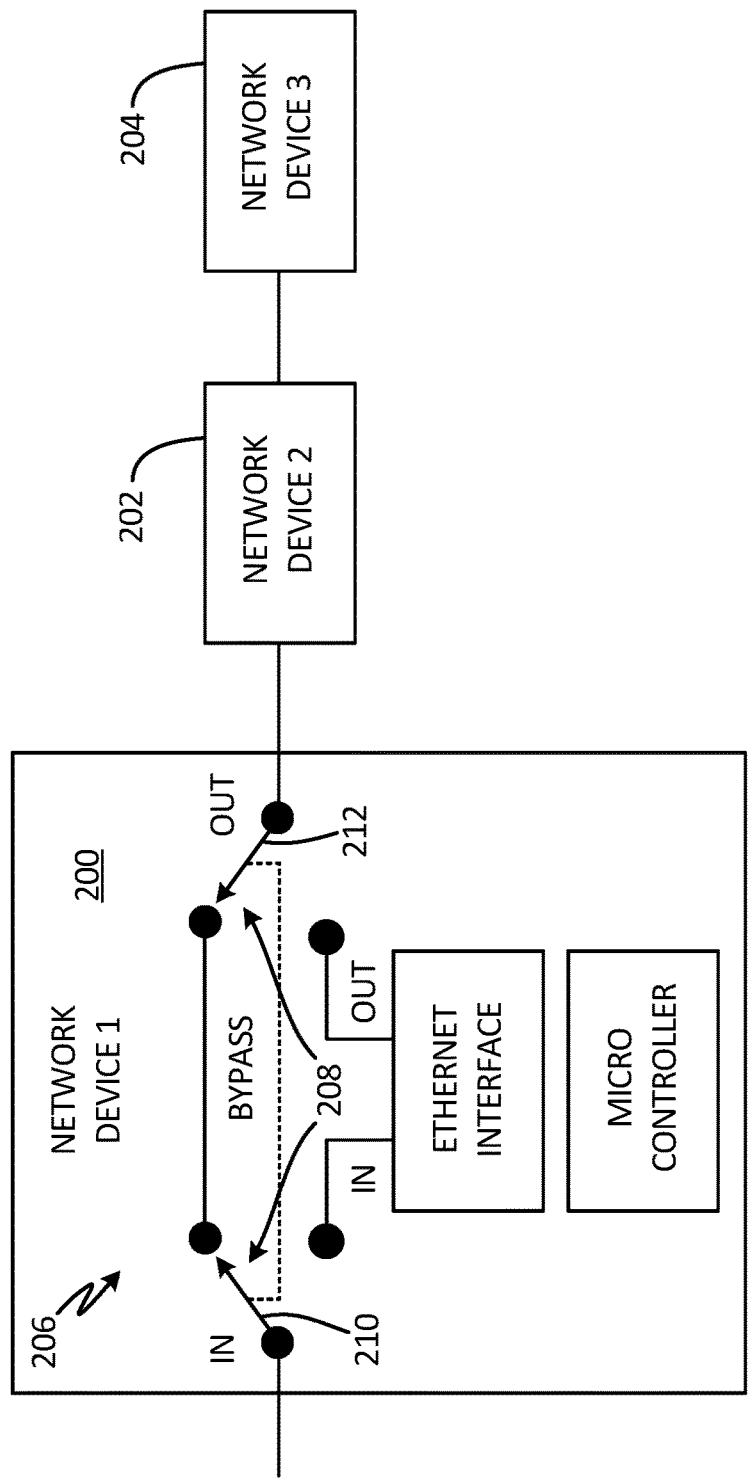
FIG. 5 is a schematic diagram of a daisy-chained network device having bypassing switches.

FIG. 5 is a schematic diagram of a daisy-chained network device having bypassing switches. In FIG. 5, three network devices 200, 202, 204 are network connected in daisy-chain fashion. Network device 200 is depicted with more detail than network devices 202, 204. Network device 200 has an integrated switching network 206 for connecting and/or bypassing network device 200 from the daisy-chain network. Switching network 206 includes a two-pole switch 208. First pole 210 connects or bypasses Ethernet input port 212 to or from the daisy chain network, respectively. Second pole 214 connects of bypasses Ethernet output port 216 to or from the daisy chain network, respectively. First and second poles 210, 214 are ganged together so as to operate in a coordinated fashion.

Various embodiments can use various configurations of switching networks. For example, in some embodiments a three-pole switch can be used to provide network connection to or bypassing of a network device. A first switch can connect an Ethernet input port to a first network port. A second switch can connect an Ethernet output port to a second network port. And a third switch can connect the first network port to the second network port. The first and second switches might be normally-open switches, while the third switch might be a normally closed switch. All three switches may have their poles ganged together so as to operate in a coordinated fashion.

The following are non-exclusive descriptions of possible embodiments of the present invention.

A switching device for bypassing a daisy-chained network device from a wired network includes a first network connector configured to connect to a first wired network port of the daisy-chained network device. The switching device includes a second network connector configured to connect to a second wired network port of the daisy-chained network device. The switching device includes a normally-closed switch having a first terminal, a second terminal and a pole. The first terminal is electrically connected to the first network connector. The second terminal electrically is connected to the second network connector. The pole, when energized, opens the normally-closed switch such that the first and second terminals are electrically isolated from one another. The switching device includes a resettable timer having an input port and an output port. The input port is configured to receive reset signals. The output port is electrically coupled to the pole of the normally-closed switch. The resettable timer is configured to generate an output signal on the output port that energizes the pole during a predetermined time period following every reset signal received and de-energizes the pole after the predetermined time period following a last of the received reset signals.

A further embodiment of the foregoing switching device, wherein the resettable timer can be further configured to receive the reset signal from the daisy-chained device. A further embodiment of any of the foregoing fan drive gear systems, wherein the resettable timer can be further configured to receive the reset signal from a master device connected to the network. A further embodiment of any of the foregoing fan drive gear systems, wherein the daisy-chained network device can be a wireless remote data concentrator. A further embodiment of any of the foregoing fan drive gear systems, wherein the reset signal can include data indicative of the predetermined time period. A further embodiment of any of the foregoing fan drive gear systems, wherein a loss of power can de-energize the pole. A further embodiment of any of the foregoing fan drive gear systems, wherein the network can be an Ethernet network. A further embodiment of any of the foregoing fan drive gear systems, wherein the predetermined time period can be a first predetermined time period. The resettable timer can be further configured to receive a remove command signal. In response to receiving the remove command signal, the resettable timer can be disabled for a second predetermined time period, during which time period the output signal can de-energize the pole of the normally-closed switch. A further embodiment of any of the foregoing fan drive gear systems, wherein the resettable timer can be further configured to receive the remove command signal from the daisy-chained device. A further embodiment of any of the foregoing fan drive gear systems, wherein the resettable timer can be further configured to receive the remove command signal from a master device connected to the network.

A method for selectively bypassing a daisy-chained device from a wired network that includes providing a first network connector configured to electrically connect to a first wired network port. The method includes providing a second network connector configured to electrically connect to a second wired network port. The method includes receiving a series of reset signals. The method includes electrically disconnecting the first network connector from the second network connector during a predetermined time period following a last of the received reset signals of the series. The method also includes electrically connecting the first network connector to the second network connector after the predetermined time period following the last of the received reset signals of the series.

The method of the preceding paragraph can optionally include, additionally and/or alternatively, any one or more of the following features, configurations and/or additional components: receiving operating power from a daisy-chained network device; and connecting the first network connector to the second network connector, if operating power is not received from a daisy-chained network device.

A further embodiment of any of the foregoing methods, wherein receiving the series of reset signals can include receiving, from the daisy-chained network device, the series of reset signals. A further embodiment of any of the foregoing methods, wherein receiving the series of reset signals can include receiving, from a master device connected to the network, the series of reset signals. A further embodiment of any of the foregoing methods, wherein the predetermined time period can be a first predetermined time period, and the method can further include receiving a remove command signal. The method can further include disconnecting the first network connector from the second network connector during a second predetermined time period following the received remove command signal. During the second predetermined time period following the received remove command signal, the connecting the first network connector to the second network connector step can be suspended.

A switching device for bypassing a daisy-chained network device from a wired network includes a first network connector configured to connect to a first network port of the daisy-chained network device. The switching device includes a second network connector configured to connect to a second network port of the daisy-chained network device. The switching device includes a normally-closed switch having a first terminal, a second terminal and a pole. The first terminal is electrically connected to the first network connector. The second terminal is electrically connected to the second network connector. The pole, when energized, opens the normally-closed switch such that the first and second terminals are electrically isolated from one another. The switching device also includes a resettable counter configured to generate a count from an initial count value to a final count value at a predetermined rate when the count is not equal to the final count value. The count is set to the initial count value upon receiving a reset signal. The resettable counter is configured to energize the pole of the normally-closed switch in response to the count value being not equal to the final count value and to de-energizes the pole if the count value is equal to the final count value.

A further embodiment of the foregoing switching device, wherein the resettable counter is further configured to receive the reset signal from the daisy-chained device. A further embodiment of any of the foregoing switching devices, wherein the resettable counter is further configured to receive the reset signal from a master device connected to the network. A further embodiment of any of the foregoing switching device, wherein the reset signal includes data indicative of the initial and/or final counts.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A switching device for bypassing a daisy-chained network device from a wired network, the device comprising:
 a first network connector configured to connect to a first wired network port of the daisy-chained network device;
 a second network connector configured to connect to a second wired network port of the daisy-chained network device;
 a normally-closed switch having a first terminal, a second terminal and a pole, the first terminal electrically connected to the first network connector, the second terminal electrically connected to the second network connector, and the pole, when energized, opening the normally-closed switch such that the first and second terminals are electrically isolated from one another; and a resettable timer having an input port and an output port, the input port configured to receive reset signals, the output port electrically coupled to the pole of the normally-closed switch, the resettable timer configured to generate an output signal on the output port that energizes the pole during a predetermined time period following every reset signal received and de-energizes the pole after the predetermined time period following a last of the received reset signals.

2. The switching device of claim 1, wherein the resettable timer is further configured to receive the reset signal from the daisy-chained device.

3. The switching device of claim 1, wherein the resettable timer is further configured to receive the reset signal from a master device connected to the network.

4. The switching device of claim 1, wherein the daisy-chained network device is a wireless remote data concentrator.

5. The switching device of claim 1, wherein the reset signal includes data indicative of the predetermined time period.

6. The switching device of claim 1, wherein a loss of power de-energized the pole.

7. The switching device of claim 1, wherein the network is an Ethernet network.

8. The switching device of claim 1, wherein the predetermined time period is a first predetermined time period, wherein the resettable timer is further configured to receive a remove command signal, wherein, in response to receiving the remove command signal, the resettable timer is disabled for a second predetermined time period, during which time period the output signal de-energizes the pole of the normally-closed switch.

9. The switching device of claim 8, wherein the resettable timer is further configured to receive the remove command signal from the daisy-chained device.

10. The switching device of claim 8, wherein the resettable timer is further configured to receive the remove command signal from a master device connected to the network.

11. A method for bypassing a daisy-chained network device from a wired network, the method comprising:
electrically connecting, via a first network connector, a switching device to a first wired network port of the daisy-chained network device;
electrically connecting, via a second network connector, the switching device to a second wired network port of the daisy-chained network device;
electrically connecting, via first and second terminals of a normally-closed switch, the normally closed switch between the first and second network connector, respectively, wherein the normally-closed switch has a pole;
opening, when a pole of the normally-closed switch is energized, the normally-closed switch such that the first and second terminals are electrically isolated from one another;
electrically coupling an output port of a resettable timer to the pole of the normally-closed switch;
receiving, via an input port of a resettable timer, a series of reset signals; and
generating, by the resettable timer, an output signal on the output port that energizes the pole during the predetermined time period following every reset signal received and de-energizes the pole of the normally-closed switch so as to close the normally-closed switch after the predetermined time period following a last of the series of reset signals received.

12. The method of claim 11, wherein receiving the series of reset signals comprises:
receiving, from the daisy-chained network device, the series of reset signals.

13. The method of claim 11, wherein receiving the series of reset signals comprises:
receiving, from a master device connected to the network, the series of reset signals.

14. The method of claim 11, wherein the predetermined time period is a first predetermined time period, the method further comprising:
receiving a remove command signal;
disconnecting the first network connector from the second network connector during a second predetermined time period following the received remove command signal, wherein, during the second predetermined time period following the received remove command signal, the connecting the first network connector to the second network connector step is suspended.

15. The method of claim 11, further comprising:
receiving operating power from a daisy-chained network device.

16. The method of claim 11, further comprising:
connecting the first network connector to the second network connector, if operating power is not received from a daisy-chained network device.

17. A switching device for bypassing a daisy-chained network device from a wired network, the device comprising:
a first network connector configured to connect to a first network port of the daisy-chained network device;
a second network connector configured to connect to a second network port of the daisy-chained network device;
a normally-closed switch having a first terminal, a second terminal and a pole, the first terminal electrically connected to the first network connector, the second terminal electrically connected to the second network connector, and the pole, when energized, opening the normally-closed switch such that the first and second terminals are electrically isolated from one another; and
a resettable counter configured to generate a count from an initial count value to a final count value at a predetermined rate when the count is not equal to the final count value, the count being set to the initial count value upon receiving a reset signal, the resettable counter configured to energize the pole of the normally-closed switch in response to the count value being not equal to the final count value and to de-energizes the pole if the count value is equal to the final count value.

18. The switching device of claim 17, wherein the resettable counter is further configured to receive the reset signal from the daisy-chained device.

19. The switching device of claim 17, wherein the resettable counter is further configured to receive the reset signal from a master device connected to the network.

20. The switching device of claim 17, wherein the reset signal includes data indicative of the initial and/or final counts.

* * * * *